(12) United States Patent
Walsh et al.

(10) Patent No.: US 9,713,005 B2
(45) Date of Patent: *Jul. 18, 2017

(54) APPARATUS AND METHOD OF LOCATION BASED TELECOMMUNICATION AUTHORIZATION

(75) Inventors: Richard J. Walsh, Raleigh, NC (US); Alfredo C. Issa, Apex, NC (US); Benjamin Ferid Issa, Apex, NC (US)

(73) Assignee: CRANBROOK TECHNOLOGY, LLC, Peterborough, NH (US)

(*) Notice: Subject to any disclaimer, the term of this patent is extended or adjusted under 35 U.S.C. 154(b) by 1424 days.

This patent is subject to a terminal disclaimer.

(21) Appl. No.: 12/947,274

(22) Filed: Nov. 16, 2010

(65) Prior Publication Data

US 2011/0159856 A1 Jun. 30, 2011

Related U.S. Application Data

(63) Continuation of application No. 12/648,417, filed on Dec. 29, 2009, now Pat. No. 7,840,226.

(51) Int. Cl.
H04W 24/00 (2009.01)
H04W 12/08 (2009.01)
H04L 29/06 (2006.01)
H04M 3/42 (2006.01)
H04M 3/436 (2006.01)
(Continued)

(52) U.S. Cl.
CPC .......... *H04W 12/08* (2013.01); *H04L 63/107* (2013.01); *H04M 3/42348* (2013.01); *H04M 3/436* (2013.01); *H04W 4/02* (2013.01); *H04W 4/028* (2013.01); *H04L 67/18* (2013.01); *H04M 2207/18* (2013.01)

(58) Field of Classification Search
CPC ....... H04W 12/08; H04W 4/02; H04W 4/028; H04L 63/107; H04L 67/18; H04M 3/42348; H04M 3/436
USPC ...... 455/456.1, 404.2, 414.2, 433, 440, 457; 379/142.1, 207.12, 140.05, 142.06
See application file for complete search history.

(56) References Cited

U.S. PATENT DOCUMENTS 6,999,777 B1 2/2006 Ganesh
7,236,577 B2 6/2007 Lection et al.
(Continued)

OTHER PUBLICATIONS

Wu, Xiaotao, et al., "Location-based Services in Internet Telephony," IEEE Consumer Communications and Networking Conference, Jan. 3-6, 2005, CCNC, 2005, 6 pages.
(Continued)

Primary Examiner — Wayne Cai

(57) ABSTRACT

An apparatus and method directed to automated call screening, and specifically the utilization of location history of a call recipient to determine call authorization, are provided. In accordance with an exemplary embodiment, a computer readable medium embodied in an article of manufacture is encoded with instructions for directing a processor to receive a request from a first device to communicate with a second device. The processor is further directed to determine at least one location associated with the first device, determine an authorization for the request based at least in part upon the at least one location associated with the first device and at least one prior location of the second device, and transmit the request to the second device in accordance with the authorization.

5 Claims, 8 Drawing Sheets

(51) Int. Cl.
*H04W 4/02* (2009.01)
*H04L 29/08* (2006.01)

(56) References Cited

U.S. PATENT DOCUMENTS

| | | |
|---|---|---|
| 7,715,828 B2 | 5/2010 | Amin |
| 2006/0035647 A1 | 2/2006 | Eisner et al. |
| 2006/0270391 A1 | 11/2006 | Kim et al. |
| 2006/0291629 A1* | 12/2006 | Esh et al. .................... 379/67.1 |
| 2007/0172042 A1 | 7/2007 | Winikoff et al. |
| 2007/0197233 A1 | 8/2007 | Feng |
| 2008/0076395 A1 | 3/2008 | Bhatia et al. |
| 2008/0242271 A1 | 10/2008 | Schmidt et al. |
| 2009/0086947 A1* | 4/2009 | Vendrow .................. 379/201.12 |
| 2009/0156187 A1 | 6/2009 | Sweeney et al. |

OTHER PUBLICATIONS

Notice of Allowance mailed May 28, 2010, for U.S. Appl. No. 12/648,417.
Notice of Allowance mailed Oct. 13, 2010, for U.S. Appl. No. 12/648,417.

* cited by examiner

APPARATUS AND METHOD OF LOCATION BASED TELECOMMUNICATION AUTHORIZATION

This application is a continuation of U.S. patent application Ser. No. 12/648,417, filed Dec. 29, 2009, the disclosure of which is incorporated herein by reference in its entirety.

FIELD OF THE DISCLOSURE

The present disclosure relates to automated call screening, and specifically relates to the utilization of location history of a call recipient to determine call authorization.

BACKGROUND

The proliferation of mobile communication devices, such as cell phones, has resulted in increased access by callers to users of such devices. As users typically carry their cell phones with them as they travel and move about, increasing portions of a user's life occur during periods of time when the user is reachable or otherwise able to be contacted. This increasing user availability results in a loss of private time during which a user might prefer to exert control over the ability of persons and/or entities to engage in communication. In order to reduce the number of unwanted calls that are received by a cell phone user, it is desirable to filter incoming calls to eliminate or otherwise defer requests for communication, such as phone calls, from specified callers.

SUMMARY OF THE DETAILED DESCRIPTION

The present disclosure is related to utilizing a location history of a call recipient to determine if a call should be authorized and transmitted to the recipient. In accordance with an exemplary embodiment, an apparatus includes a communication interface and a controller associated with the communication interface and configured to receive a request from a first device to communicate with a second device. The controller further operates to determine at least one location associated with the first device. The controller then operates to determine an authorization for the request based at least in part upon the at least one location associated with the first device and at least one prior location of the second device. If authorized, the call request is transmitted to the second device in accordance with the authorization.

In an alternative embodiment, there is provided a method comprising receiving a request from a first device to communicate with a second device, determining at least one location associated with the first device, determining an authorization for the request based at least in part upon the at least one location associated with the first device and at least one prior location of the second device, and transmitting the request to the second device in accordance with the authorization.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

Figure 1:
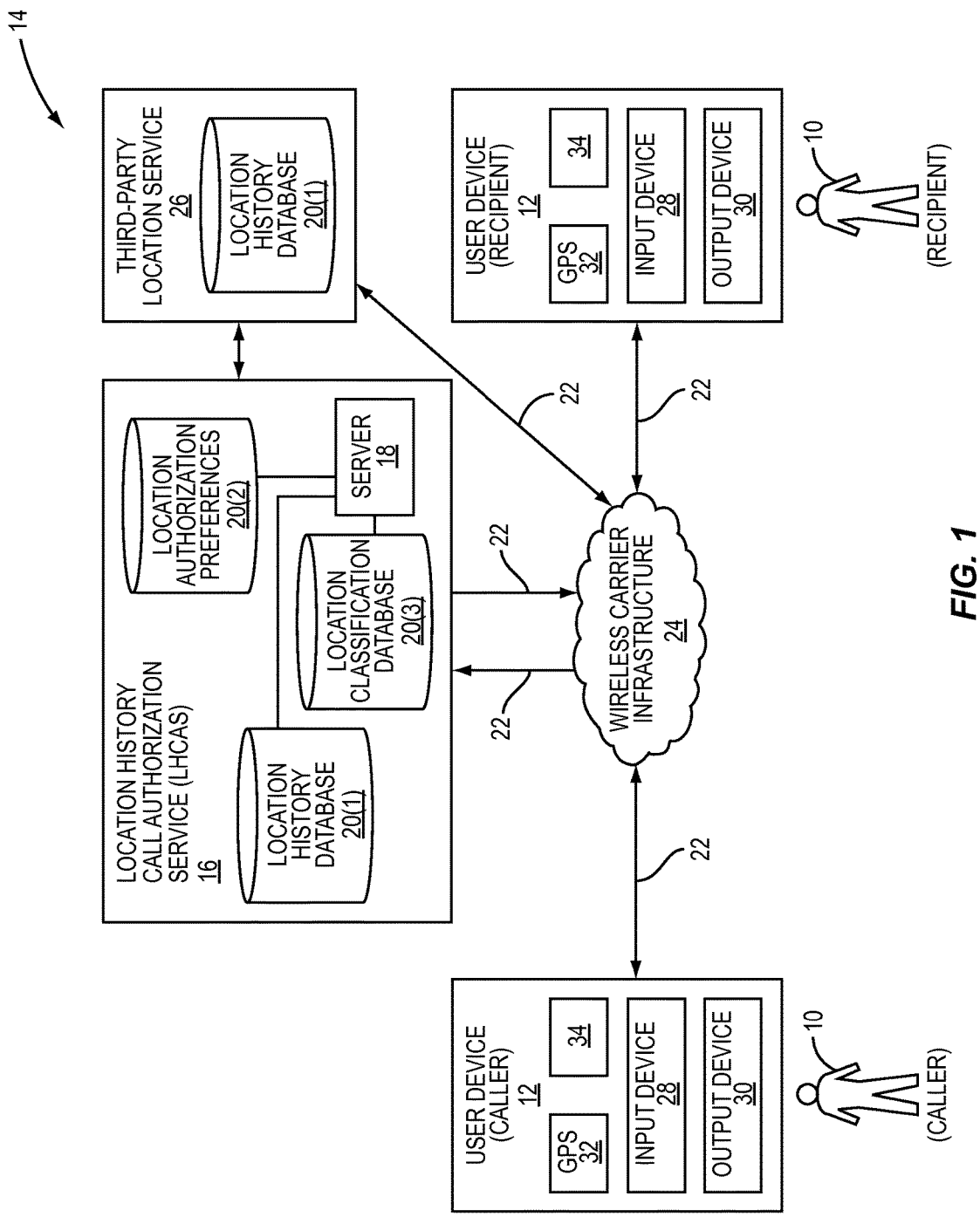
FIG. 1 illustrates a system for providing location based telecommunications according to a first embodiment of the present disclosure.

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

In accordance with exemplary and non-limiting embodiments, an apparatus and methods are disclosed relating to authorizing incoming and/or outgoing mobile phone calls based, at least in part, on a location history of mobile phone users associated with the calls. A location history call authorization service (LHCAS) operates within a wireless carrier infrastructure, femtocell, and/or mobile phone to analyze phone call data related to a call request using a set of configurable rules that examine location history data of call participants. Based upon the resulting authorization, the LHCAS can process the call request in various manners including, but not limited to, accepting the call, rejecting the call, forwarding the call to voicemail, and forwarding the call to an interactive voice response system to screen the phone call.

As used herein a "user device" refers, broadly, to any and all devices enabling a first user to engage in voice communication with a second user utilizing a second user device. Examples of user devices include, but are not limited to, telephones, cell phones, voice communication enabled computers, personal digital assistants (PDAs), and the like. In various exemplary and non-limiting embodiments disclosed below, a user device is an iPhone™ by Apple, Inc. of Cupertino, Calif.

As used herein, "caller" refers to a user utilizing a user device to place or make a call to another user. Further, as used herein, "recipient" refers to a user utilizing a user device and who is the intended receiver of a call placed by a caller.

As described more fully below, a user 10, operating or otherwise associated with a user device 12, has a location history including information describing times and geographic locations associated with past whereabouts of the user 10. In accordance with some exemplary and non-limiting embodiments, location history data associated with a user 10 is formed of information acquired by a user device 12 in close proximity to the user 10 when the information was determined and recorded. Similarly, communications from a LHCAS to a user 10 are typically performed via sending data to a user device 12 having an associated output device for delivering data and information to a "user." As a result, references to a "user 10" and to a "user device 12" or "device 12" may be used interchangeably where appropriate. For example, a call request from a first user device 12 associated with a first user 10 to a second user device 12 associated with a second user 10 may be referred to as a call from a first user 10 to a second user 10. As a further example, where appropriate, location history information associated with a user 10 via a user device 12 associated with the user 10 may be referred to as, simply, location history of the user 10.

A system 14 described below includes an LHCAS 16 that stores location information associated with users 10 of devices 12. Location data associated with a user 10 may be obtained from one or more different user devices 12 associated with the user 10. In general, location information derived for a user 10 is approximately equal to the location information of a user device 12 being operated by, carried upon, or otherwise operating in proximity to a user 10. As a result, references to a "user location" and a "device location" of a device 12 associated with the user 10 are used interchangeably herein.

FIG. 1 illustrates an exemplary and non-limiting embodiment of the system 14 for authorizing incoming and/or outgoing mobile phone calls and call requests based, at least in part, on a location history of mobile phone users 10 associated with the calls according to exemplary embodiments disclosed herein. As illustrated, the system 14 includes the LHCAS 16. As described more fully below, the LHCAS 16 is a logical grouping of elements capable of functioning in a coordinated manner to receive call requests and data attendant thereto, to process the call requests, and to transmit data and information to external entities as described.

The LHCAS 16 comprises at least one computing device, such as a server 18, to receive inputs, to compute results based, at least in part, upon the inputs, and to output results. The server 18 may access instructions encoded in a computer readable medium to direct a processor to perform the step discussed more fully below. The server 18 is in communication with one or more databases 20(1-N). In exemplary embodiments, the databases 20(1-N) include a location history database 20(1), a location authorization preferences database 20(2), and a location classification database 20(3).

The location history database 20(1) stores one or more locations associated with a user 10 of a user device 12. Locations and other geospatial data associated with a user 10 may be gathered by a user device 12 during operation and communicated to the LHCAS 16. In an exemplary embodiment, a user device 12 incorporates Global Positioning System (GPS) capability to determine a location of the user device 12. In other exemplary embodiments, the location of the user device 12 is determined by an entity external to the user device 12 such as through a process of triangulation from cell towers having a known position. Regardless of the method by which a location of the user device 12 is determined, such location information is transmitted to and stored in the location history database 20(1). One or more locations associated with a user 10 may be stored in any manner capable of being searched for and retrieved including, but not limited to, a tabular form comprising an approximate longitude and latitude for each location.

The location classification database 20(3) stores data derived from data stored in the location history database 20(1) and associated with a user 10. For example, a record stored in the location history database 20(1) may record a location having a latitude and longitude of 36.000507 and −78.938484, respectively, and an acquisition time of 11:30 am on Jan. 1, 2009. As described more fully below, the LHCAS 16 can operate to determine that the location to which the record refers is within a park. In response to this determination, the LHCAS 16 stores a record in the location classification database 20(3) indicating that the user 10 was at a location classified as a park at 11:30 am on Jan. 1, 2009.

The location authorization preferences database 20(2) stores rules. Specifically, the location authorization preferences database 20(2) stores rules that define the manner in which data stored, for example, in the location history database 20(1) and the location classification database 20(3) are to be processed in order to determine an authorization for a call request. As described more fully below, the rules stored in the location authorization preferences database 20(2) operate upon, in part, the data in the location history database 20(1) and the location classification database 20(3) to determine whether or not to authorize transmission of call requests to a user 10.

The LHCAS 16 is further communicatively coupled to one or more user devices 12 via a network 22. The network 22 may be any type of wired network, any type of wireless network, or any combination thereof. As one example, the network 22 is a public, distributed network such as the Internet, where the user devices 12 are connected to the network 22 via wired or wireless network connections. A wireless carrier infrastructure 24 may be interposed between entities coupled via the network 22. While illustrated as separate entities, in accordance with exemplary embodiments, the wireless carrier infrastructure 24 may comprise a part or substantially all of the network 22.

The LHCAS 16 may be further communicatively coupled to one or more third party location services 26 each comprising a location history database 20(1). The third party location service 26 operates to receive, store, and provide access to location information associated with a user 10. In an exemplary embodiment, the LHCAS 16 requires credentials to obtain access to the data controlled by the third party location service 26.

A user 10 operating a user device 12 can initiate call requests to and receive call requests from another user 10 operating another user device 12 via the wireless carrier infrastructure 24. Each user device 12 includes an input device 28 and an output device 30. The input device 28 comprises any device capable of receiving information from a user 10 in any form including, but not limited to, text, audio, and image information. A user device 12 may include a GPS 32. The GPS 32 operates to determine a location of the user device 12. The location of the user device 12 may be determined without the need for a GPS 32, for example, using a process of triangulation from at least three cell towers in communication with the user device 12. In some embodiments, when utilizing a system such as Global System for Mobile Communication (GSM), a Home Local Register (HLR) contains administrative information of each user 10 registered in the corresponding GSM network, along with the current location of the associated user device 12 providing the wireless carrier infrastructure 24 with access to the current location of the user device 12. The user device 12 may also include a LHCAS tool 34, which is discussed below in association with FIG. 7.

While the LHCAS 16 is illustrated as an entity separate from the wireless carrier infrastructure 24, the LHCAS 16 may be part of the wireless carrier infrastructure 24. In accordance with exemplary and non-limiting embodiments, all or a portion of the LHCAS 16 may reside on a cellular base station, such as a femtocell, associated with a user 10, or on a user device 12, such as a mobile phone.

Figure 2:
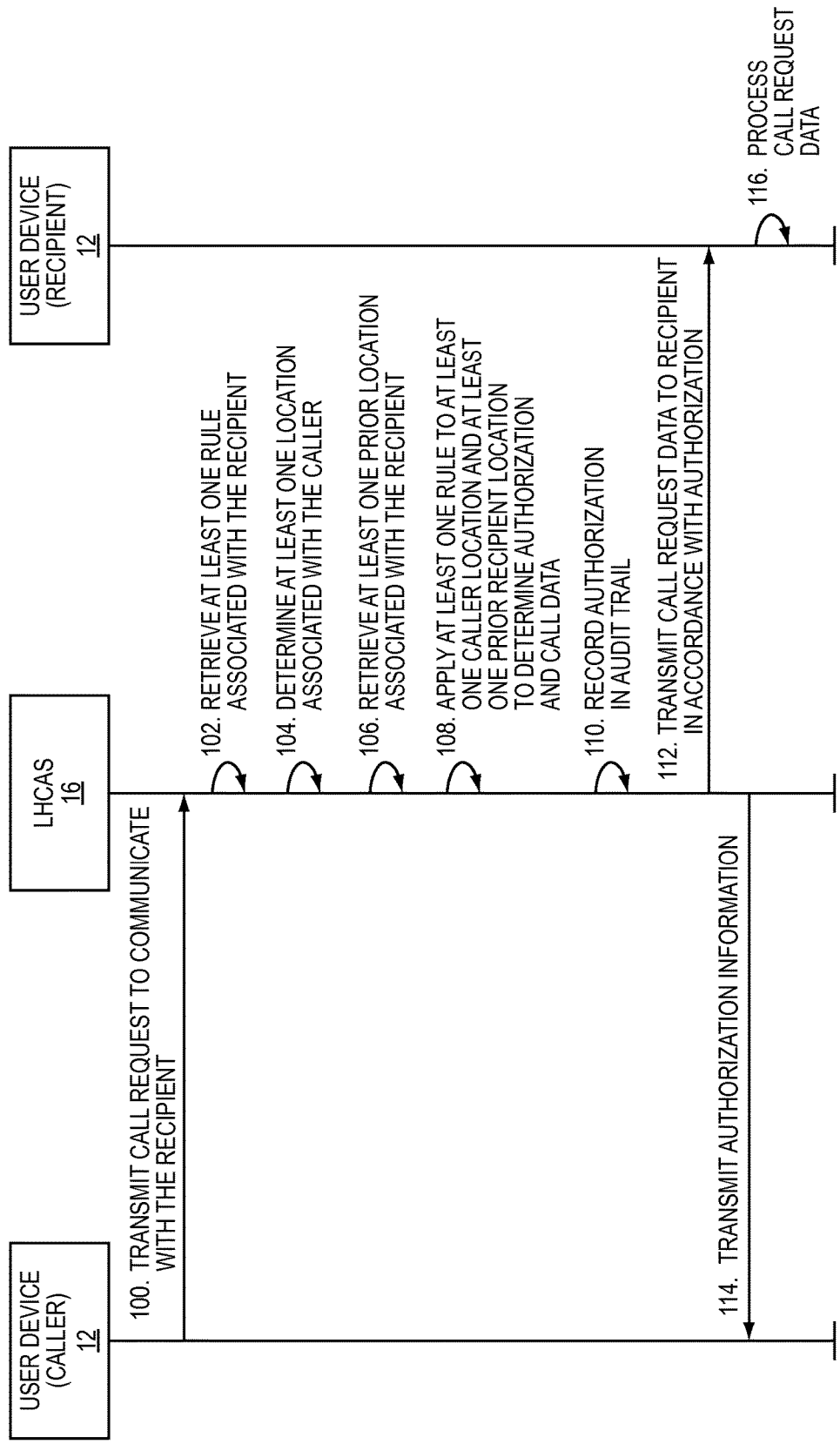
FIG. 2 illustrates a flow diagram of the operation of a location history call authorization service (LHCAS) according to a first embodiment of the present disclosure.

FIG. 2 illustrates the operation of the system 14 of FIG. 1 according to one embodiment of the disclosure. As illustrated, first, a caller user device 12 associated with a user 10 desiring to make a call transmits a request to communicate with another user 10 via a recipient user device 12 that has been configured to receive incoming calls via the LHCAS 16 (step 100). In accordance with an exemplary embodiment, the user 10 of the recipient user device 12 may have purchased access to the LHCAS 16. The wireless carrier infrastructure 24 receives the call request and attendant call data and, if it is determined that data associated with the user 10 of the recipient user device 12 is stored in the LHCAS 16 or that the call request is otherwise entitled to use of the LHCAS 16, transmits the call request and call data to the LHCAS 16.

Next, the LHCAS 16 looks up at least one rule associated with the user 10 of the recipient user device 12 (step 102). Specifically, one or more location history rules associated with the recipient user device 12 is retrieved, such as from the location authorization preferences database 20(2). The one or more location history rules define how the LHCAS 16 operates to authorize the call request and what actions to take in response thereto. As a single user 10 may operate a plurality of recipient user devices 12, different location history rules may be stored in and retrieved from the location authorization preferences database 20(2) for each recipient user device 12 associated with a user 10. Conversely, the LHCAS 16 may be configured to apply a single set of location history rules associated with a user 10 to all recipient user devices 12 associated with the user 10.

The manner by which location history rules are determined and stored in the location authorization preferences database 20(2) include, but are not limited to, manual configuration by the user 10 of the recipient user device 12, selection from a system provided template, selection from popular settings, and, as described more fully below, automated rule derivation. In exemplary embodiments, a user 10 of a recipient user device 12 may designate certain location history rules to be operable and applicable based upon, for example, a day or days of a week, times of a day, and a context associated with a user 10 or a user device 12.

The LHCAS 16 further operates to determine at least one location associated with the user 10 of the caller user device 12 (step 104). In an exemplary embodiment, the at least one location is the approximate location of the caller user device 12. Such location information may be derived by utilizing a caller ID, subscriber information, an International Mobile Equipment Identifier (IMEI), an Integrated Circuit Card ID (ICCID), and the like to obtain caller information from the caller user device's 12 HLR or other similar entity. In accordance with an exemplary embodiment, location information such as GPS location is provided in the call data or is derived from cell global identity, location area identifier, from the third-party location service 26, or the like.

Next, the LHCAS 16 operates to retrieve at least one prior location associated with the recipient user device 12 from the location history database 20(1) (step 106). Then, the one or more location history rules are applied to the at least one location associated with the caller user device 12 and the at least one prior location associated with the recipient user device 12 to determine a call authorization (step 108). In exemplary and non-limiting embodiments, the location history rules are applied to location information associated with both the recipient user device 12 and the caller user device 12 to provide "similar to" or "related to" types of comparisons.

When processing the location history rules, the LHCAS 16 may utilize, in addition to data retrieved from the location history database 20(1), current location data for the recipient user device 12, user preferences of the user 10 of the recipient user device 12, user device 12 context, and the like as may be stored in any of the databases 20(1–N). As noted above, the LHCAS 16 has access to a knowledge base stored in the location classification database 20(3) that includes classifications of locations including, but not limited to, classifications based upon GPS coordinates and GSM internal identifiers such as cell tower identifier, phone numbers, and the like. Such locations can be classified using an ontology, list, or the like. For example, a GPS location comprised of the latitude and longitude coordinates (36.000507, −78.938484) may be associated with "Duke University," "school," "university," "medical," and/or "research."

The following pseudo-code provides an example set of rules that might be applied by the LHCAS 16 to a call request received from a user device 12 comprising a mobile phone requesting to communicate with a recipient:

```
if ( mobile phone calling is located at a location classified as
   "medical" or "school" ) {
accept call
} else if ( mobile phone calling is located somewhere recipient has
   been in the last 7 days ) {
accept call
} else if ( mobile phone calling is located somewhere recipient has
   been in the last 30 days ) {
forward call to call screening system
} else if ( mobile phone calling is located somewhere recipient has
   been in the last 6 months ) {
forward call to voicemail
} else {
reject call
}
```

In accordance with the application of the exemplary location history rules described above, the LHCAS 16 first checks whether the recipient user device 12 is located in a place related to "medical" or "school." For example, the LHCAS 16 receives call data with the call request providing the GPS coordinates of the location of the recipient user device 12. The LHCAS 16 accesses the location classification database 20(3) and, using the GPS coordinates as an index in a structured query language (SQL) query, retrieves one or more classifications. If any one of the retrieved classifications is "medical" or "school," the LHCAS 16 provides an authorization for the call request allowing the call to be forwarded for acceptance by the user 10 of the recipient user device 12.

The remaining location history rules in the example specify an action based on whether the recipient user device 12 has been at or near the location from which the caller user device 12 is making the call request. While these exemplary location history rules evaluate the current location of the caller user device 12 with the location history of one or more user devices 12 associated with the user 10 of the recipient user device 12, the LHCAS 16 is further configured to compare the location history of the caller user device 12 with the location history of the recipient user device 12 to adaptively process incoming phone calls.

For example, a caller user device 12 is owned and operated by a city park and recreation administrator and a recipient user device 12 is owned and operated by a user 10 drawn to outdoor excursions that often visits parks within the same city. In an exemplary embodiment, the LHCAS 16 authorizes the caller user device 12 to contact the recipient user device 12 because either the user 10 or the recipient user device 12 associated with the user 10 is associated with one or more location history rules that authorize the reception of incoming calls when the caller user device 12 has visited the same places in the past (e.g., both the caller user device 12 and the recipient user device 12 have been to the same park).

In yet another example, the LHCAS 16 determines that, although neither of the caller user device 12 or the recipient user device 12 have visited the same park in the past, both the recipient user device 12 and the caller user device 12 have visited "park" related locations. As a result, the LHCAS 16 proceeds to authorize transmission of the call request to the recipient user device 12.

In a further example, one or more location history rules may operate, alone or in concert, to further define a relationship between a location history of a caller user device 12 and a location history of a recipient user device 12 by, for example, appending or otherwise utilizing a geospatial descriptor. For example, a location history rule or rules may specify a requirement that a caller user device 12 has not only visited locations with an associated classification of "park" but that, further, the visited park is in the Raleigh, N.C. metropolitan area.

After applying the location history rules, the LHCAS 16 records data descriptive of the authorization process and the authorization as audit trail data in one or more storage devices, such as a database 20 of the LHCAS 16 (step 110). The audit trail data may be subsequently accessed by the user 10 of the recipient user device 12 such as via the LHCAS tool 34 operating on the recipient user device 12 and described more fully below.

After determining call request data comprising the authorization and the audit trail data related thereto, the LHCAS 16 transmits the call request data to the recipient user device 12 in accordance with the authorization (step 112). In exemplary embodiments, the LHCAS 16 transmits the determined authorization, including such information as the action to take (e.g., accept call, reject call, forward call, etc.), as well as additional information, such as may comprise stored audit trail data, to the recipient user device 12 via the wireless carrier infrastructure 24. Examples of such additional information include, but are not limited to, an identifier, a name or description of a location history rule or rules that were used to determine the authorization, maps, a notification that a call was rejected with the reason, an origin location, options to adjust the location history rule or rules utilized, or call back the user 10 of the recipient user device 12. The wireless carrier infrastructure 24 receives the call request data and processes the call request according to the authorization from the LHCAS 16.

In accordance with an exemplary and non-limiting embodiment, the LHCAS 16 may transmit information related to the determination of the authorization to the caller user device 12 (step 114). For example, the caller user device 12 receives data from the wireless carrier infrastructure 24 indicating that the call request was rejected due to an unauthorized location. Next, upon receipt of the call request data, the recipient user device 12 operates to process the call request data (step 116).

Figure 3:
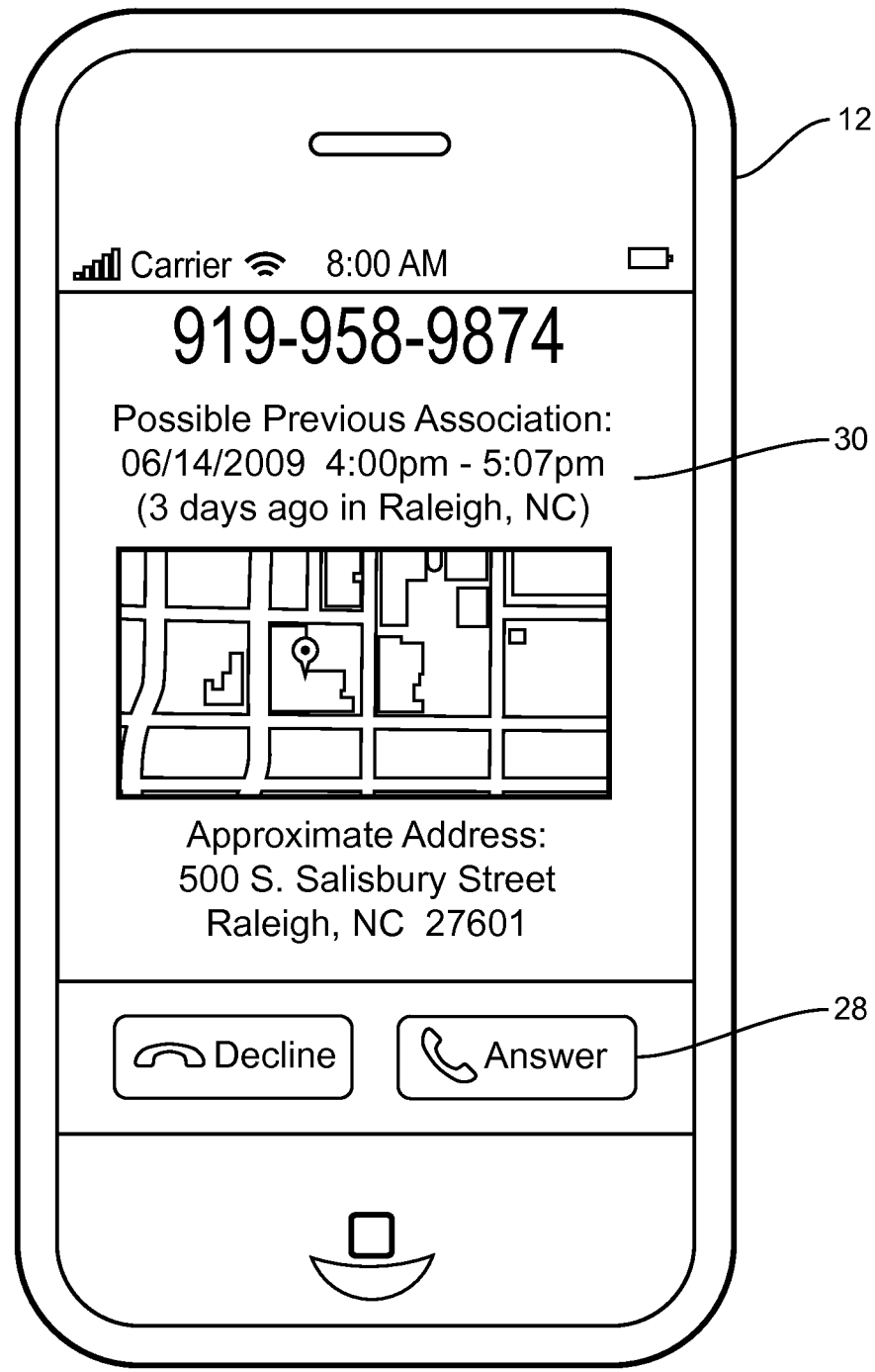
FIG. 3 illustrates a graphic display of a device according to an embodiment of the present disclosure.

FIG. 3 illustrates an exemplary embodiment of a recipient user device 12 upon processing the call request data. As illustrated, the output device 30 of the recipient user device 12 displays information indicating that a call has been authorized for receipt by the recipient user device 12. Specifically, information is displayed informing the user 10 that a call request from a caller user device 12 having a phone number of "919-958-9874" has been authorized for receipt. There is further displayed data indicating that the authorization was based, at least in part, upon a determination of a possible previous association involving a previous location of the user 10 on "Jun. 14, 2009 4:00 pm-5:07 pm" in Raleigh, N.C. Lastly, there is displayed an approximate location of the caller and a map of the approximate location of the caller. The input device 28 is provided in the form of a Graphical User Interface (GUI) including "decline" and "answer" buttons by which the user 10 may decline or answer the incoming call request.

Figure 4:
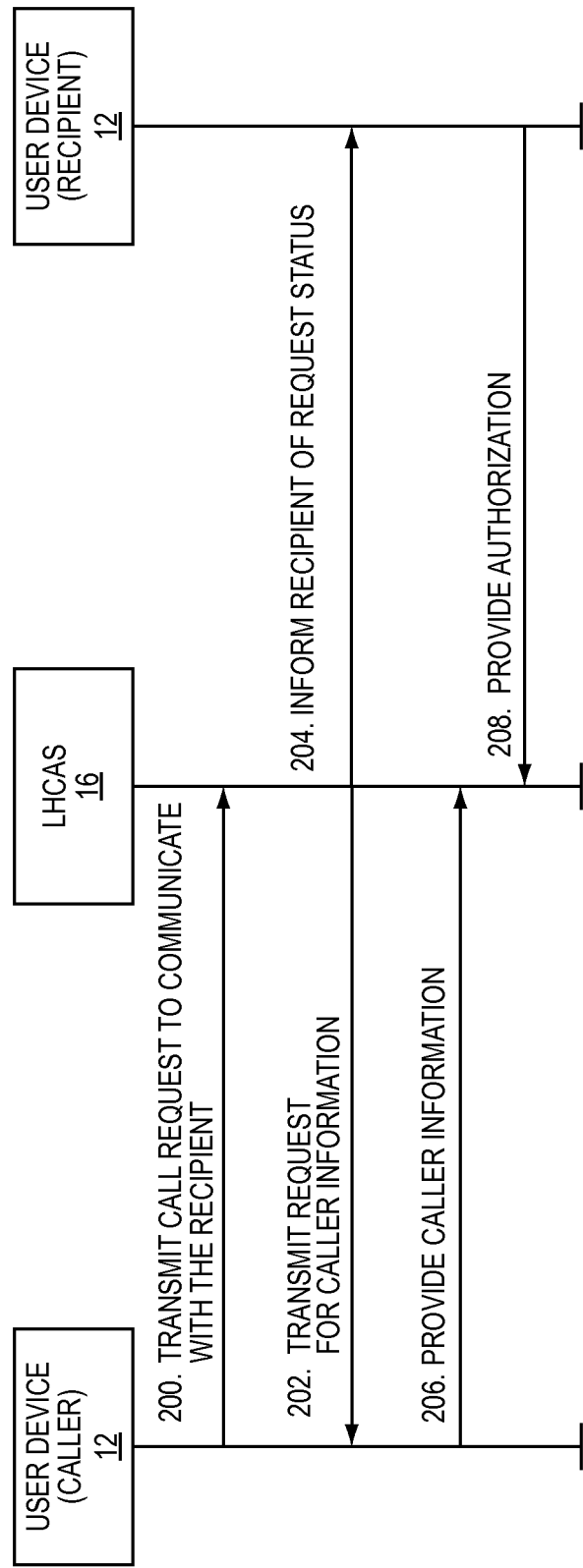
FIG. 4 illustrates a flow diagram of the operation of a LHCAS according to an embodiment of the present disclosure.

FIG. 4 illustrates the operation of the system 14 of FIG. 1 according to an exemplary and non-limiting embodiment of the disclosure. While previously described in accordance with an embodiment wherein the LHCAS 16 has access to the location information and location history rules necessary to process a call request, in accordance with other exemplary embodiments, the LHCAS 16 may operate to transmit to and receive information from both the caller user device 12 and the recipient user device 12 as needed to determine an authorization.

In accordance with an exemplary embodiment, a caller user device 12 associated with a user 10 desiring to make a call transmits a call request to communicate with a user 10 associated with a recipient user device 12 that has been configured to receive incoming calls via the LHCAS 16 (step 200). Upon receiving the call request, the LHCAS 16 may provide an interaction with the user 10 of the caller user device 12 by transmitting a request for caller information to the caller user device 12 (step 202). For example, the LHCAS 16 may, in an automated manner, transmit a request for caller information to inform the user 10 of the caller user device 12 that the call is being evaluated. In another embodiment, if the LHCAS 16 does not have access or permission to the current location or location history of the user 10 of the caller user device 12, the LHCAS 16 can request authorization from the user 10 of the caller user device 12 to the data in order to evaluate the call.

In accordance with exemplary embodiments, the LHCAS 16 may also communicate with the recipient user device 12 to provide a status notification that an incoming call request authorization is in process (step 204). Such notifications may include incremental updates based on data obtained by the LHCAS 16 during the authorization process and provide options to adjust the authorization process. In response to the request for caller information, the user 10 of the caller user device 12 may provide additional information to the LHCAS 16 (step 206). For example, the user 10 of the caller user device 12 may provide credentials and may enable all subsequent location history authorization requests for outgoing calls from the caller user device 12 to access such credentials.

For example, a recipient user device 12 is first provided a notification viewable on an output device 30 of the recipient user device 12 indicating an incoming call request is being processed by the LHCAS 16 (caller id), a second notification that the location of the user 10 of the recipient user device 12 has been determined (display location on a map), a third notification that a location history rule has failed (caller is not at a medical related location), a fourth notification that a location history rule has failed (caller is not at a park related location), and so forth.

In response, the user 10 of the recipient user device 12 may provide authorization for the call request (step 208). For example, the recipient user device 12 may present the user 10 of the recipient user device 12, via the output device 30, with options to adjust the authorization process. For example, the user 10 of the recipient user device 12 is provided with and selects an option to "accept and allow location" when the user 10 of the recipient user device 12 recognizes the location of the user 10 of the caller user device 12 on a map that is displayed on the recipient user device 12.

In an exemplary embodiment, the location history database 20(1) stores, at least, a collection of GPS locations, paths, dates, and times spent by a user device 12. An example record of a database table entry of location data for a user 10 is as follows:

| Location Red. ID | Device ID | Start Time | End Time | Location Data (gps location, devices in proximity) |
|---|---|---|---|---|
| 100 | device_1 | Jan. 1, 2009 11:30 | Jan. 1, 2009 12:01 | (36.000507, −78.938484), device_2, device_3 |
| 101 | device_2 | Jan. 1, 2009 11:00 | Jan. 1, 2009 11:45 | (37.000321, −78.888281), device_1, device_3 |
| 102 | device_3 | Jan. 1, 2009 11:40 | Jan. 1, 2009 12:30 | (36.888282, −78.232111), device_1, device_2 |

As illustrated, each record is identified by a unique location record ID corresponding to a device ID of a user device 12. In addition, each record records the duration of time, from a start time to an end time, that the user device 12 was associated with a location. Record entries may include, in addition to a GPS location, the device IDs associated with other user devices 12 in proximity to the user device 12 designated in the device ID column while at the specified location. With reference to the above example record, device_1 was in the approximate location specified by the latitude and longitude coordinates (36.000507, −78.938484) for approximately 31 minutes on Jan. 1, 2009. At that time, device_1 was in proximity to device_2 and device_3. User devices 12 in proximity to one another can be derived from a comparison of GPS locations and times. In an exemplary embodiment, a user device 12 is capable of detecting and providing to the LHCAS 16 a list of user devices 12 in proximity to itself. Location history rules may utilize location history data associated with callers and recipients to interpret user devices 12 with a history of being in close proximity to one another as an indication of higher affinity amongst their respective users 10, therefore resulting in a call request authorization.

The LHCAS 16 operates to analyze location information in the location history database 20(1) to classify the types of locations that a mobile phone visits. In an exemplary embodiment, the system 14 communicates with a knowledge base to obtain classification information about locations a user device 12 visits. For example, the LHCAS 16 queries the location classification database 20(3) with a set of GPS locations and receives a response of "medical." In one embodiment, the LHCAS 16 may then update a record in the location history database 20(1) associated with the user 10 and the GPS location to record that the location is a medical location. In another example, the location classification database 20(3) may be updated to associate the user 10 and associated GPS location with the classification of "medical."

Figure 5:
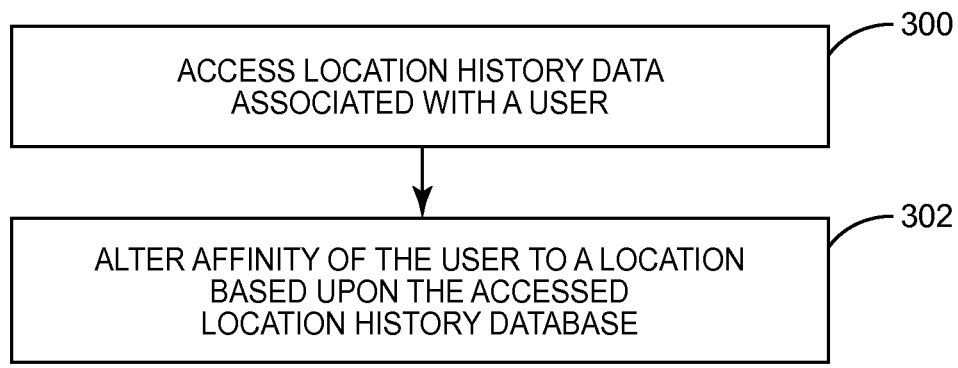
FIG. 5 illustrates a flow diagram of the operation of a LHCAS according to an embodiment of the present disclosure.

FIG. 5 illustrates a flow diagram of an exemplary and non-limiting embodiment whereby an affinity of a user 10 to a location is altered by the LHCAS 16. As illustrated, the LHCAS 16 accesses location history data associated with a user 10 (step 300). Then, the LHCAS 16 automatically adjusts the user's 10 affinity with a location based on, for example, how often the user 10 visits the location (step 302). This may be accomplished by adjusting the parameters of existing location history rules, creating new location history rules, or deleting existing location history rules. Specifically, rules may be changed to decrease the likelihood of a call request being authorized from a call originating at a location over time. For example, the LHCAS 16 can deactivate a previously allowed location because the user 10 has not visited that location in a predetermined amount of time. The user 10 can define thresholds for how fast location affinity decays in general, for specific locations, or based on semantics (e.g., "restaurants" keep active for six months, "park" keeps active for a year, "medical" always keeps active, etc). A user 10 may be provided prefabricated templates such as all location history decays after six months, popular settings from people in proximity to the user 10, having similar location histories, or otherwise determined to share a characteristic with the user 10.

Conversely, the LHCAS 16 can automatically increase affinity based on the frequency of relatively recent visits to a location. This may be accomplished by adjusting the parameters of existing location history rules, creating new location history rules, or deleting existing location history rules. Specifically, location history rules may be changed to increase the likelihood of a call request being authorized from a call originating at a location over time. For example, a user 10 may have a surge in visiting a new restaurant for lunch resulting in a relatively few but recent number of records in the location history database 20(1) recording proximity of the user 10 to the restaurant. A location history rule allows authorization of a call request associated with the restaurant's location even though there is not a large amount of historical data associated with the restaurant location.

In accordance with an exemplary embodiment, it may be advantageous for new users 10 to "quick start" their settings by enabling the LHCAS 16 to establish, via the creation or alteration of location history rules, affinities with locations the user 10 visits during a predetermined period of time after subscribing to or otherwise activating operation of the LHCAS 16. After a predetermined period of time, the LHCAS 16 can inform the user 10 that enough location data has been gathered to commence processing location data in accordance with location history rules not unduly weighted based upon the user's 10 location history immediately subsequent to activation of the LHCAS 16.

In accordance with an exemplary embodiment, a user 10 can also configure location history rules associated with the user 10 by manually adjusting, such as via a GUI interface utilizing the input device 28 and output device 30 of a user device 12, their historical affinity with a location or location classification. For example, a user 10 can alter the strength of a location history rule or rules defining an affinity with a park location they walk through on the way to work because of undesirable people that loiter in the park.

In accordance with exemplary embodiments, a location history of a user 10 can include data gathered from a plurality of user devices 12 each associated with the user 10. For example, a user 10 may own and operate several user devices such as, for example, an iPhone®, a Kindle®, a PDA, and the like. The LHCAS 16 applies rules to data aggregated from the location history database 20(1) and the location classification database 20(3) wherein the data is derived from user devices 12 associated with a user 10.

In accordance with an exemplary embodiment, a first user 10 may allow the LHCAS 16 to utilize the first user's location history when applying location history rules related to authorizations of call requests directed to the user device 12 of a second user 10. By so doing, the second user 10 gains access to a larger volume of trusted location history data, specifically, that of the first user 10. A user 10 may allow the LHCAS 16 to utilize location history data related to the user 10 for use by all other users 10, specified other users 10, or other users 10 identified by the LHCAS 16 as being associated with the user 10, such as via a relationship established through a social network. For example, a first user 10 may allow sharing of their location history with other users 10 who are members of their social network either explicitly, by providing an identification of specific users 10, or, implicitly, by allowing the LHCAS 16 to determine the identities of other users 10 associated with the first user 10 via a social network. A user 10 can configure the sharing of location history data such that only locations with a certain classification are shared (e.g., "restaurant" locations near "work" with work related members of a social network).

As another example, a parent can configure his or her location authorization preferences such that all user devices 12 operated by users 10 comprising one or more family members share their respective location history data for purposes of location history rule processing by the LHCAS 16. In another example, a user 10 who is a parent may configure the LHCAS 16 to process call requests to a user device 12 associated with a child of the parent such that the parent's user device 12 receives a notification from the LHCAS 16 whenever a call request is sent from or to the child's user device 12. In an exemplary embodiment, the parent user 10 can view the location information associated with the call request and is provided options to control the processing of the call request.

In accordance with another exemplary embodiment, the LHCAS 16 may be configured to execute location history rules utilizing the location history from other users 10 that are unrelated and unknown to a first user 10 of a user device 12. As a result, the LHCAS 16 operates using location history data derived from other users 10 similar to the first user 10 where similarity is based, for example, on location, demographics, location history, social network profile data, etc. The LHCAS 16 may provide information to a recipient informing the recipient as to how a community of users 10 related to the recipient (based on some criteria) have processed calls associated with a current location or location history of a caller.

In an exemplary embodiment, a user 10 may receive a notification that their location history data was used or is requested for use by another user 10 with sharing options (e.g., allow share, reject request, anonymously share, etc). This may be particularly useful for situations in which one user 10 has relevant location history for a call request being processed. For example, the LHCAS 16 may process a call for a recipient Alice who lacks information related to the incoming call request. Alice's user device 12 may present a "Request Help" option via the output device 30 of Alice's user device 12 allowing her to request location history information from other users 10 associated with Alice (e.g., via a social network, people nearby, etc). The LHCAS 16 may provide a list of users 10 in Alice's social network that have relevant information accessible by the LHCAS 16 and that Alice can select to request help from those users 10. In another example, the LHCAS 16 may automatically issue location history requests on behalf of Alice while processing a call request. For example, the LHCAS 16 determines that Bob, a user related to Mary via a social network, has relevant associated location history data that would be useful in determining the authorization for a call request to Mary. The LHCAS 16 automatically issues a request to Bob to share the location history data that would be useful to Mary. Bob receives a notification of the request on his user device 12 and can select sharing options accordingly. For example, an output device 30 on Bob's user device 12 displays "Your location history information about 'restaurants' in the Raleigh, N.C. area would be helpful for Mary. Okay to share?" Bob may respond, such as by activating displayed radio buttons corresponding to "Yes" and "No," whereby the LHCAS 16 is informed of Bob's response.

In addition to the results of a call request authorization, the LHCAS 16 may transmit additional information via the wireless carrier infrastructure 24 to a recipient associated with the authorization process. For example, the LHCAS 16 may transmit information to the wireless carrier infrastructure 24 to be delivered to a recipient user device 12 that indicates the user or users 10 whose location history was used to process the call request, the location history data that was used to accept/reject the call request, a profile and/or an image of the users 10, etc. The wireless carrier infrastructure 24 can then forward the information or references to the recipient user device 12 for presentation to the recipient. For example, the recipient user device 12 shows that an incoming call request was authorized for reception because the recipient's friends, Mary and Sally, have both visited the location from which the call request was placed (e.g., a restaurant). The recipient user device 12 may also show that the recipient's friends, Alice and Bob, have no history with that location.

In accordance with exemplary embodiments discussed above, the LHCAS 16 executes location history rules that process call request data and location history data at the time of a call request in order to make a determination as to call request authorization. The location history rules process the data in a customizable manner and can adjust the value associated with relevant location data according to user preferences (decay over time, increase due to frequency, etc). In other words, the operation of the LHCAS 16 is reactive based on calculations that create an implicit understanding of a user's 10 value associated with the location data.

Figure 6:
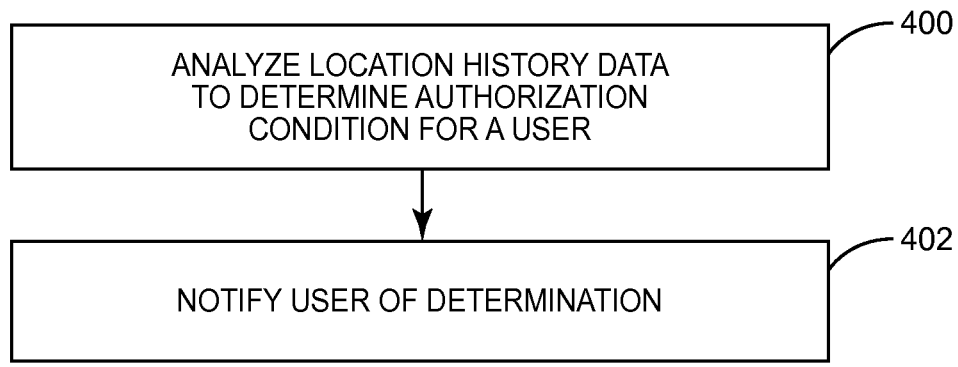
FIG. 6 illustrates a flow diagram of the operation of a LHCAS according to an embodiment of the present disclosure.

In accordance with exemplary embodiments, the LHCAS 16 proactively analyzes location history to assist a user 10 in explicitly identifying location and location classifications. FIG. 6 illustrates a method whereby the LHCAS 16 operates to analyze the location history associated with a user 10 to determine an authorization condition associated with call requests (step 400). In an exemplary embodiment, this analysis is performed in a batch mode and updated periodically, such as once every 24 hours. In accordance with other exemplary embodiments, the LHCAS 16 repeatedly examines location data in a continuous, or semi-continuous, manner so as to determine and provide notifications to a user 10 of potential associations. In accordance with one embodiment, these associations allow the LHCAS 16 to more efficiently process call requests by shortcutting location history rule processing and location history analysis at the time of the call request. Once determined, the authorization conditions may be stored, for example, as location history rules in the location authorization preferences database 20(2).

Furthermore, the LHCAS 16 may provide notifications to a user 10 that an authorization condition has been determined (step 402). Such notifications may be merely informational in nature or may allow the user 10, such as via an input device 28, to respond to a query based, in part, upon the authorization condition determination. An exemplary authorization condition might be based on cumulative time spent or frequency of visits by a user 10 in an area. For example, the LHCAS 16 compares the user's 10 location history from the location history database 20(1) to the location classifications of the location classification database 20(3) and determines that the user 10 has walked through a park on the way to a local store ten times for a total time spent of 60 minutes. In response to this determination, the LHCAS 16 communicates with the user 10 via a user device 12 and queries the user 10 if call requests originating from the park are explicitly allowed. Further, the LHCAS 16 may operate to generalize location characteristics of a user's 10 location history and to similarly query the user 10 in response thereto. For example, the LHCAS 16 may query the user 10 to determine if the user 10 desires to authorize all call requests originating in any "park" related location within a city because of the amount of time the user 10 has spent in park related locations.

In accordance with other non-limiting embodiments, the LHCAS 16 may provide notifications to a user 10 upon detection of potential undesirable locations. As used herein, "undesirable locations" refer to locations or location classifications that a user 10 has avoided (travels around, etc.), not visited, visited once and never returned, etc. The user 10 can decide whether to authorize call requests originating from or associated with the undesirable location or undesirable location classification.

In accordance with an exemplary and non-limiting embodiment, the LHCAS 16 provides notifications to a user 10 when a first user 10 associated with a user device 12 having an associated location history overlaps with the location history of another user 10. For example, the LHCAS 16 notifies Alice that Bob, Sally, and Mary all visit the local park and Alice is queried if she would like to authorize future call requests associated with Bob, Sally, and Mary. Furthermore, Alice can associate the authorization of call requests from Bob, Sally, and Mary such that, when Alice ceases to visit parks, call requests from Bob, Sally, and Mary are no longer authorized.

In accordance with other exemplary embodiments, the LHCAS 16 provides notifications to a user 10 regarding entities, such as businesses and other users 10, that are in an area that the user 10 frequently visits. For example, Alice walks by the local pizza shop on the way to work every day. The LHCAS 16 examines her path, performs an address search for entities (businesses, individuals) that are near her path, and then looks up the phone numbers of those entities. The LHCAS 16 then provides Alice with a notification asking her whether she would allow incoming/outgoing call requests to the discovered entities along her path. Similar to the exemplary embodiments above, the authorization of the entities can be associated with the user's 10 location history such that the entities may be automatically deemed to be no longer valid (e.g., if the user 10 changes jobs) or deemed to be valid (e.g., if the user 10 continues to go to work the same way each day).

In another embodiment, the LHCAS 16 can notify a user 10 when the user 10 has spent a certain amount of time in an area. For example, the LHCAS 16 determines that a user 10 has remained in a 25 meter area for 30 minutes and prompts the user 10 if they would like to add a location history rule to allow incoming or outgoing calls from the current location or similar locations. The LHCAS 16 can deliver notifications at the time of discovery, at the time of exit/entrance to a location, at the time of proximity to a business, every hour, every day, etc.

In addition, or as an alternative to notifications, a user 10 can use a LHCAS tool 34 to manage their settings, including associated location history rules, review potential entities to authorize, view their location history, create new authorizations, and the like. The LHCAS tool 34 may be a web application the user 10 accesses with a web browser, a mobile device application that communicates with the LHCAS 16, or the like. Regardless of its form, the LHCAS tool 34 operates to provide a visual indicia of data to a user 10, such as via an output device 30 of a user device 12, and to receive data from a user device 12, such as via an input device 28.

Figure 7:
FIG. 7 illustrates a graphic display of a device according to an embodiment of the present disclosure.

FIG. 7 illustrates an exemplary output of the LHCAS tool 34 showing a sample set of data collected for a user 10 over a period of time. In the example, shaded numbers indicate numbers associated with entities having fixed positions that were determined to be associated with the user 10 based, at least in part, upon location history data associated with the user 10, such as derived from GPS data. For example, the user 10 spent a significant amount of time at 1501 Laura Duncan Road. As a result, the LHCAS 16, such as via operation of the server 18, determines the landline number associated with that address. Unshaded numbers represent numbers associated with user devices 12 which spent, for example, a significant amount of time in proximity to the user 10.

Figure 8:
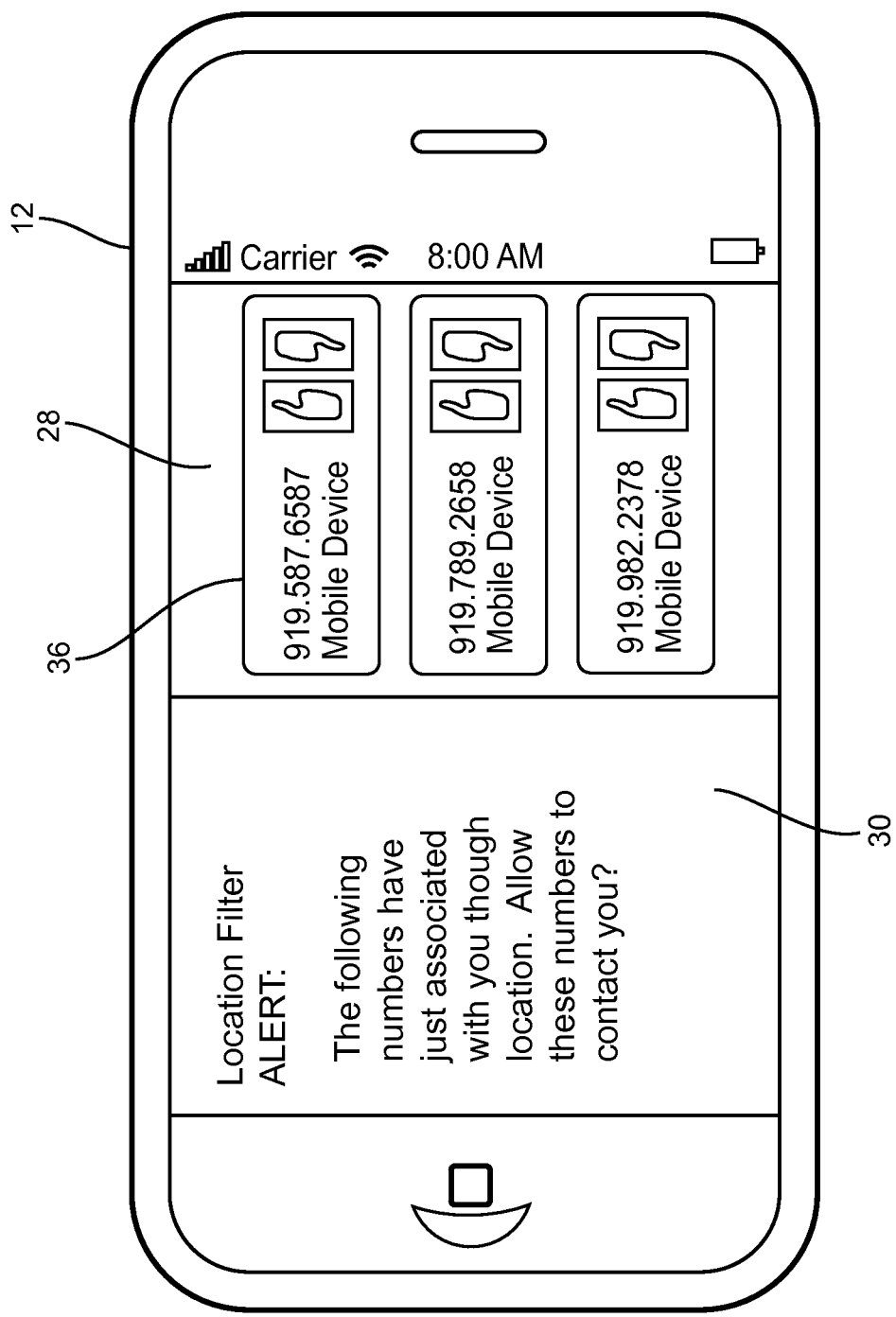
FIG. 8 illustrates a graphic display of a device according to an embodiment of the present disclosure.

FIG. 8 illustrates a query on a user's output device 30. Specifically, a plurality of entities displayed in FIG. 7 are presented to a user 10 as having been determined to be associated with the user 10 via location history associated with the user 10. The user 10 may, via icons 36 forming a part of the input device 28, communicate to the LHCAS 16 that call requests associated with individual ones of the plurality of entities are to be authorized.

Figure 9:
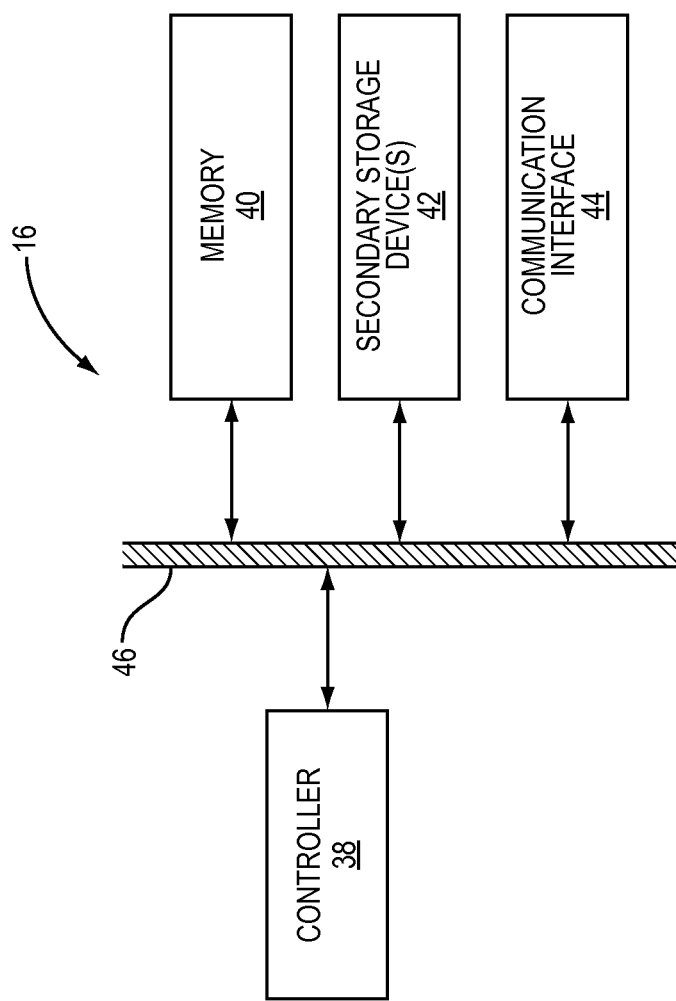
FIG. 9 is a block diagram of the LHCAS of FIG. 1 according to one embodiment of the present disclosure.

FIG. 9 is a block diagram of the LHCAS 16 of FIG. 1 according to one embodiment of the present disclosure. As illustrated, the LHCAS 16 includes a controller 38 connected to memory 40, one or more secondary storage devices 42, and a communication interface 44 by a bus 46 or similar mechanism. The controller 38 is a microprocessor, digital Application Specific Integrated Circuit (ASIC), Field Programmable Gate Array (FPGA), or the like. In this embodiment, the controller 38 is a microprocessor, and the server 18 is implemented in software and stored in the memory 40 for execution by the controller 38. Further, depending on the particular embodiment, the databases 20(1)-20(3) are stored in the one or more secondary storage devices 42. The secondary storage devices 42 are digital data storage devices such as, for example, one or more hard disk drives. The communication interface 44 is a wired or wireless communication interface that communicatively couples the LHCAS 16 to the network 22 (FIG. 1). For example, the communication interface 44 may be an Ethernet interface, local wireless interface such as a wireless interface operating according to one of the suite of IEEE 802.11 standards, or the like.

Those skilled in the art will recognize improvements and modifications to the embodiments of the present invention. All such improvements and modifications are considered within the scope of the concepts disclosed herein and the claims that follow.

What is claimed is:

1. A method comprising:
   receiving a request from a first device to communicate with a second device;
   receiving at least one location classification from the first device and receiving at least one location classification from the second device;
   determining an authorization for the request from the first device to communicate with the second device by applying at least one rule to the at least one location classification received from the first device and the at least one location classification received from the second device, wherein determining the authorization includes comparing the at least one location classification received from the first device to at least one prior location classification associated with the second device; and
   transmitting the request from the first device to communicate with the second device upon authorization.

2. A method comprising:
   receiving a request at a location history call authorization service (LHCAS) from a first device to communicate with a second device;
   receiving at least one location classification for the first device and receiving at least one location classification for the second device;
   determining an authorization for the request from the first device to communicate with the second device by applying at least one rule to the at least one location classification for the first device and the at least one location classification received for second device, wherein determining the authorization further comprises comparing the at least one location classification received from the first device to at least one prior location classification associated with the second device; and
   transmitting the request from the first device to communicate with the second device upon authorization.

3. The method of claim 2 wherein the LHCAS is located in either the first device or the second device.

4. A computer program product stored on a non-transitory computer readable storage medium comprising instructions configured to cause a processor to carry out the steps of:
   receiving a request from a first device to communicate with a second device;
   receiving at least one location classification from the first device and receiving at least one location classification from the second device;
   determining an authorization for the request from the first device to communicate with the second device by applying at least one rule to the at least one location classification received from the first device and the at least one location classification received from the second device, wherein determining the authorization further comprises comparing the at least one location classification received from the first device to at least one prior location classification associated with the second device; and
   transmitting the request from the first device to communicate with the second device upon authorization.

5. A server comprising:
   a communication interface;
   a memory;
   a secondary storage device; and
   a controller, wherein the controller is configured to:
      receive a request from a first device to communicate with a second device;
      receive at least one location classification from the first device and receive at least one location classification fronl the second device;
      determine an authorization for the request from the first device to communicate with the second device by applying at least one rule to the at least one location classification received from the first device and the at least one location classification received from the second device, wherein determining the authorization further comprises comparing the at least one location classification received from the first device to at least one prior location classification associated with the second device; and
      transmit the request from the first device to communicate with the second device upon authorization.

* * * * *